Aug. 19, 1969  H. E. McCORMICK ET AL  3,462,333
METHOD OF MAKING SEAL
Filed Feb. 25, 1965
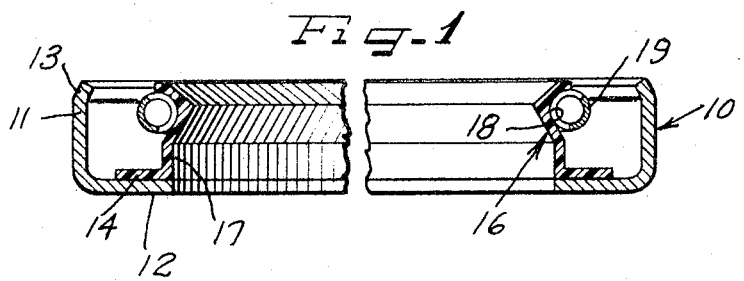
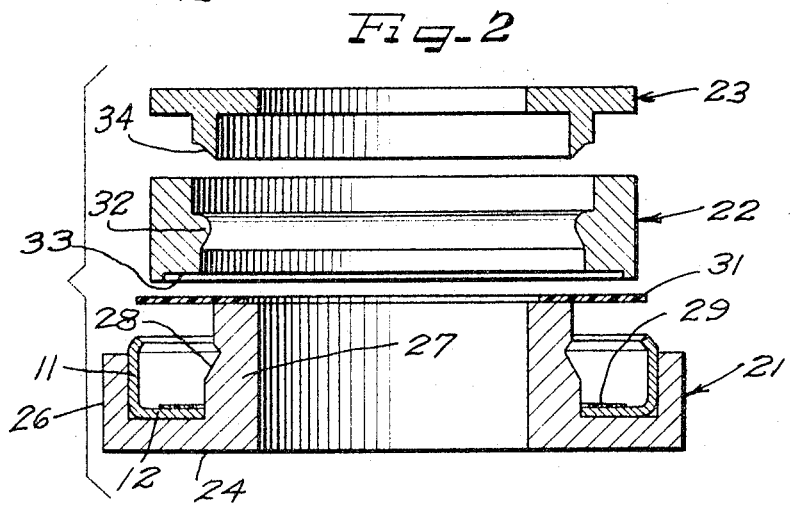
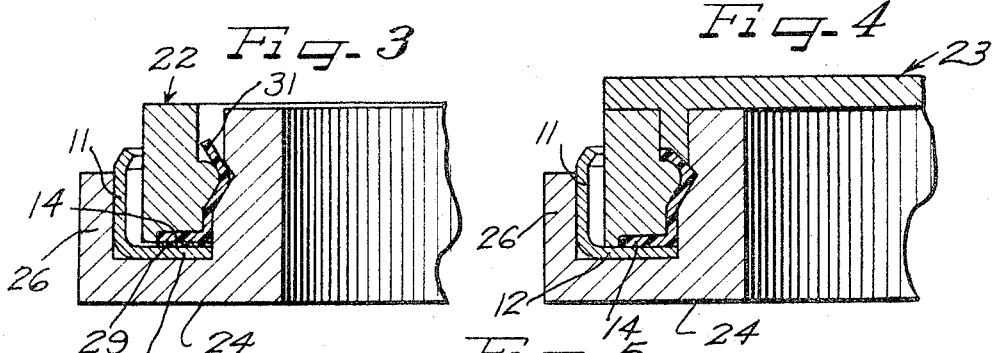
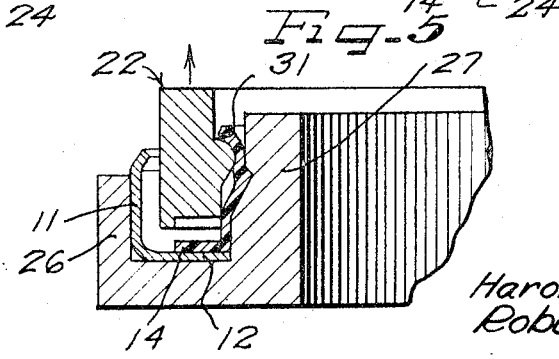
INVENTOR.
Harold E. McCormick
Robert E. Schmitt
BY Hill, Sherman, Meroni, Gross & Simpson
ATTORNEYS

United States Patent Office 3,462,333
Patented Aug. 19, 1969

3,462,333
METHOD OF MAKING SEAL
Harold E. McCormick and Robert E. Schmitt, Brentwood, Mo., assignors to Ramsey Corporation, St. Louis, Mo., a corporation of Ohio
Filed Feb. 25, 1965, Ser. No. 435,267
Int. Cl. B29c 27/16
U.S. Cl. 156—245                                      11 Claims

ABSTRACT OF THE DISCLOSURE

The method of forming a seal of polytetrafluoroethylene applied to a metal case by positioning the polytetrafluoroethylene seal within the case, interposing a thin continuous film of unsintered polytetrafluoroethylene between the seal and the case, and heating the assembly under applied pressure.

---

The present invention relates to an improved shaft seal structure, and to a method of making the same. More specifically, it relates to the manufacture of seals in which the sealing element consists of a suitably contoured shape of polytetrafluoroethylene.

Seals involving the use of polytetrafluoroethylene sealing elements are becoming more widely used because of their inherent toughness, extremely low coefficient of friction, and relatively low cost. Some means must be provided, however, to bond the sealing element to the metallic case in which it is carried. It is necessary to bond the sealing element directly to the case for various reasons, including the elimination of the possibility of oil leakage occurring at the point where the seal is attached to the case, making sure that the inside diameter of the sealing element is concentric to the outside diameter of the case, and reducing the cost.

In many types of rotary shaft oil seals employing molded polytetrafluoroethylene, the disadvantage arises that the sealing element could not be attached directly to the case during a molding operation. Due to the well known low coefficient of friction of the seal element, and its lack of affinity for metal, it has usually been necessary to lock the seal element mechanically to the case which is not always a satisfactory solution to these problems.

The present invention provides an improved seal ring employing a polytetrafluoroethylene sealing element which is directly bonded to the case during the molding or shaping of the seal element itself. In the preferred form of the present invention, the elastomeric seal element is positioned in the case, and a thin film of a fluorinated polymer different from the material of the seal element is interposed between the seal element and the case. Then, the resulting assembly is heated under pressure within a die or the like to raise the temperature of the seal element above the gel temperature, so that it takes the shape of the die cavity, and at the same time, the interposed polymeric film is softened or melts and securely bonds the seal element to the metal of the case.

The two fluorinated polymers which have exhibited the best results in connection with the present invention are (1) fluorinated ethylene propylene and (2) unsintered polytetrafluoroethylene. Polymer (1) is available commercially from E. I. Du Pont de Nemours & Co. Inc. under the trademark "Teflon FEP." As explained in "Modern Plastics Encyclopedia" 1965 Edition, page 119, the fluorinated ethylene propylene is a copolymer of polytetrafluoroethylene and hexafluoropropylene, and has the following repeating units in its elastomeric structure:

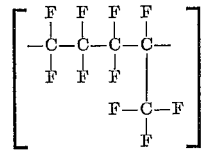

The unsintered polytetrafluoroethylene referred to above is a commercially available product whose molecular structure is very similar to the conventional sintered polytetrafluoroethylene, except that it has been extruded into the form of a sheet or film without going through a sintering operation. In the manufacture of the conventional sintered polytetrafluoroethylene, the powdered material is compacted into the desired shape, and heated above the gel temperature which is about 620° F. After cooling below the gel temperature, the material changes to a semi-crystalline form.

In the process of the present invention, the metal case is preferably used as a portion of the mold in which the elastomeric seal element is shaped. This case is positioned in the die, and a thin film of the fluorcarbon polymer to be used as a binder is positioned on the case in the area in which the elastomeric seal element is to be bonded. Then, a blank consisting of polytetrafluoroethylene in its sintered form is located in the die with one surface in contact with the sealing film, and then deformed under conditions of heat and pressure sufficient to shape the blank into the desired configuration, and to bond the shape through the medium of the film to the metal base. Typical conditions in this regard are temperatures in the range from 621° to 740° F., pressures ranging from as low as 2 to as high as 1000 pounds per square inch gauge, and dwell times in the range from about 1 to 10 minutes. Within these broader limits, the preferred operating conditions consist of temperatures ranging from 700 to 800° F., pressures on the order of 200 to 400 pounds per square inch, and dwell times of 1 to 5 minutes or so.

A further description of the present invention will be made in conjunction with the attached sheet of drawings in which:

FIGURE 1 is a view partly in elevation and partly in cross-section illustrating a shaft seal produced according to the present invention;

FIGURE 2 is an exploded view of the die assembly and the position of the elements just prior to the initiation of the molding operation;

FIGURE 3 is a fragmentary enlarged view of the assembly with 2 of the 3 die elements in position;

FIGURE 4 is a view similar to FIGURE 3, but illustrating the die completely assembled and the polymeric sealing element molded therein; and FIGURE 5 is a view similar to FIGURE 4, but illustrating the position of the elements upon withdrawal of

3 the mold sections at the completion of the molding operation.

As shown on the drawings:

In FIGURE 1, reference numeral 10 indicates generally a rotary shaft seal produced according to the present invention and including a metallic case 11 having a radially inwardly extending annular flange portion 12. The case 11 also has an angularly inwardly extending marginal portion 13 at its upper end. Secured to the annular flange portion 12 of the case 11 is a radially outwardly extending annular flange portion 14 of a sealing element 16 composed of polytetrafluoroethylene. The sealing element 14 includes a cylindrical wall portion 17 and a circumferential groove 18 which is arranged to receive a garter spring 19 therein. The garter spring 19 urges the inner periphery of the sealing element 16 against the surface to be sealed when the shaft seal 10 is placed in operative engagement with a rotary shaft.

The sealing element 12 may be fabricated in the type of mold assembly illustrated in FIGURES 2 to 5 inclusive. This assembly consists of a lower mold element generally indicated at reference numeral 21, a middle mold element indicated at reference numeral 22, and an upper mold element indicated at reference numeral 23. The lower mold element 21 has a flat base 24 and an outer cylindrical wall 26. The cylindrical wall 26 is in spaced relation with an inner wall 27 having a peripheral notch 28 thereon which ultimately forms the socket 18 of the sealing element. The dimensions of the lower mold member 21 are such that the metal case 11 is snugly received between the cylindrical wall 26 and the outer periphery of the inner wall 27, the base 12 of the metal case 11 thereby providing a portion of the mold in which the sealing element is shaped.

A thin film or shim 29 of the bonding material, such as the aforementioned fluorinated ethylene propylene is positioned on the base 12 of the metal case 10 at the initiation of the molding operation. This film 29 may be solid or may even be in the liquid form as a dispersion.

In FIGURE 2 there is shown a blank 31 composed of conventional polytetrafluoroethylene, and consisting of a flat annulus which may be skived or otherwise shaped from sintered polytetrafluoroethylene.

The middle mold member 22 has an internally extending arcuate rib 32 which helps to shape the groove 18 of the sealing member, in cooperation with the notch 28 on the lower mold member 21. The middle mold member 22 also has a circular groove 33 in the base thereof which, as shown in FIGURES 3 and 4, serves to confine the flow of the blank 31 being molded, and forms the annular flange portion 14 of the finished sealing elements.

The upper mold member 23 includes a beveled lower end portion 34 which functions to shape the upper end of the sealing element 16, as illustrated in FIGURE 4.

Referring now to FIGURE 3, after the metal case 11 has been positioned in the recess provided in the lower mold member 21, and the thin film 29 of the polymeric bonding material has been applied thereon, the middle mold member 22 is brought down on the blank 31 to shape the blank into the configuration desired in the sealing element. Next, the upper mold member 23 is brought into engagement with the rigidly positioned mold members 21 and 22, as illustrated in FIGURE 4, so that the beveled lower end portion 34 of this mold member engages the free exposed end of the blank 31 and bends it into the shape required in the finished sealing element. Then, with the three mold members in assembled relation as shown in FIGURE 4, the entire molding assembly is heated to a temperature exceeding the gel temperature of polytetrafluoroethylene. As mentioned, temperatures of 621 to 740° F. are appropriate for this step. Before this temperature is reached, however, the film 29 is softened or melted to the extent that it becomes adhesive, and bonds the outwardly extending annular flange portion 14 of the material being molded to the radially inwardly extending annular flange portion 12 of the metal face 11. After a dwell time of from 1 to 10 minutes or so at this elevated temperature, the mold may be disassembled as illustrated in FIGURE 5, whereupon the blank 31 has taken a permanent set, and has become sealed to the metal case by the adhesiveness of the interposed film 29.

From the foregoing, it will be seen that the process of the present invention provides a convenient means for sealing a polytetrafluoroethylene seal element to a metal case during the shaping of the seal element itself. The bonding of the seal element to the case during the formation of the seal element has the advantage that the inner diameter of the seal member is automatically located accurately with respect to the outer diameter of the seal case. Furthermore, this technique eliminates the necessity of possibly distorting the sealing element by heat, as necessitated by techniques which attempt to bond the sealing element to the metal case after the sealing element has been formed.

It should be evident that various modifications can be made to the described embodiments without departing from the scope of the present invention.

We claim as our invention:

1. The method of forming a seal of the type which includes a metal case and a polytetrafluoroethylene seal element bonded thereto which comprises positioning said seal element within said case, interposing a thin continuous film of unsintered polytetrafluoroethylene between said seal element and said case, and heating the resulting assembly under applied pressure at least to the gel temperature of the polytetrafluoroethylene and above the melting temperature of said film for a time sufficient to cause said seal element to be come bonded to said case.

2. The method of forming a seal of the type which includes a metal case and a polytetrafluoroethylene seal element bonded thereto which comprises interposing a continuous film of an unsintered polytetrafluoroethylene between said seal element and said case, and applying heat and pressure sufficient to form said seal element into the desired shape, and to bond said seal element to said case through the medium of said film.

3. The method of claim 1 in which the seal element during formation is heated to a temperature in the range from 621 to 740° C.

4. The method of claim 1 in which said applied pressure is in the range from 2 to 1000 pounds per square inch gauge.

5. The method of claim 1 in which said time is in the range from 1 to 10 minutes.

6. The method of claim 1 in which said assembly is heated to a temperature in the range from 621 to 740° F. at an applied pressure of 2 to 1000 pounds per square inch gauge for a time ranging from 1 to 10 minutes.

7. The method of forming a seal of the type which includes a metal case and a polytetrafluoroethylene seal element bonded to said case which comprises positioning a continuous film of unsintered polytetrafluoroethylene within said case in the area in which said seal element is to be bonded to said case, deforming a blank of polytetrafluoroethylene into the shape required in the finished seal element while pressing a portion of said blank against said film, and holding the resulting blank under pressure at a temperature in excess of the gel temperature of the polytetrafluoroethylene blank for a time sufficient to cause said blank to become permanently deformed into said shape and to cause bonding of said seal element to said case.

8. The method of claim 7 in which the blank is heated to a temperature in the range from 621 to 740° F.

9. The method of claim 7 in which the applied pressure is in the range from 2 to 1000 pounds per square inch gauge.

10. The method of claim 7 in which said time is in the range from 1 to 10 minutes.

11. The method of claim 7 in which the blank is heated to a temperature in the range from 621 to 740° F., at an applied pressure of 2 to 1000 pounds per square inch gauge, for a time ranging from 1 to 10 minutes.

References Cited

UNITED STATES PATENTS

| | | | |
|---|---|---|---|
| 2,833,686 | 5/1958 | Sandt | 161—189 XR |
| 3,304,221 | 2/1967 | Eggleton | 161—189 |

FOREIGN PATENTS

| | | |
|---|---|---|
| 796,610 | 9/1955 | Great Britain. |
| 928,267 | 6/1961 | Great Britain. |

EARL M. BERGERT, Primary Examiner

J. D. SMITH, Assistant Examiner

U.S. Cl. X.R.

161—189; 277—182